March 18, 1952  E. P. DIEFENBACH  2,589,348
ATTACHMENT FOR AUTOMOBILE SUN VISORS
Filed Jan. 29, 1947
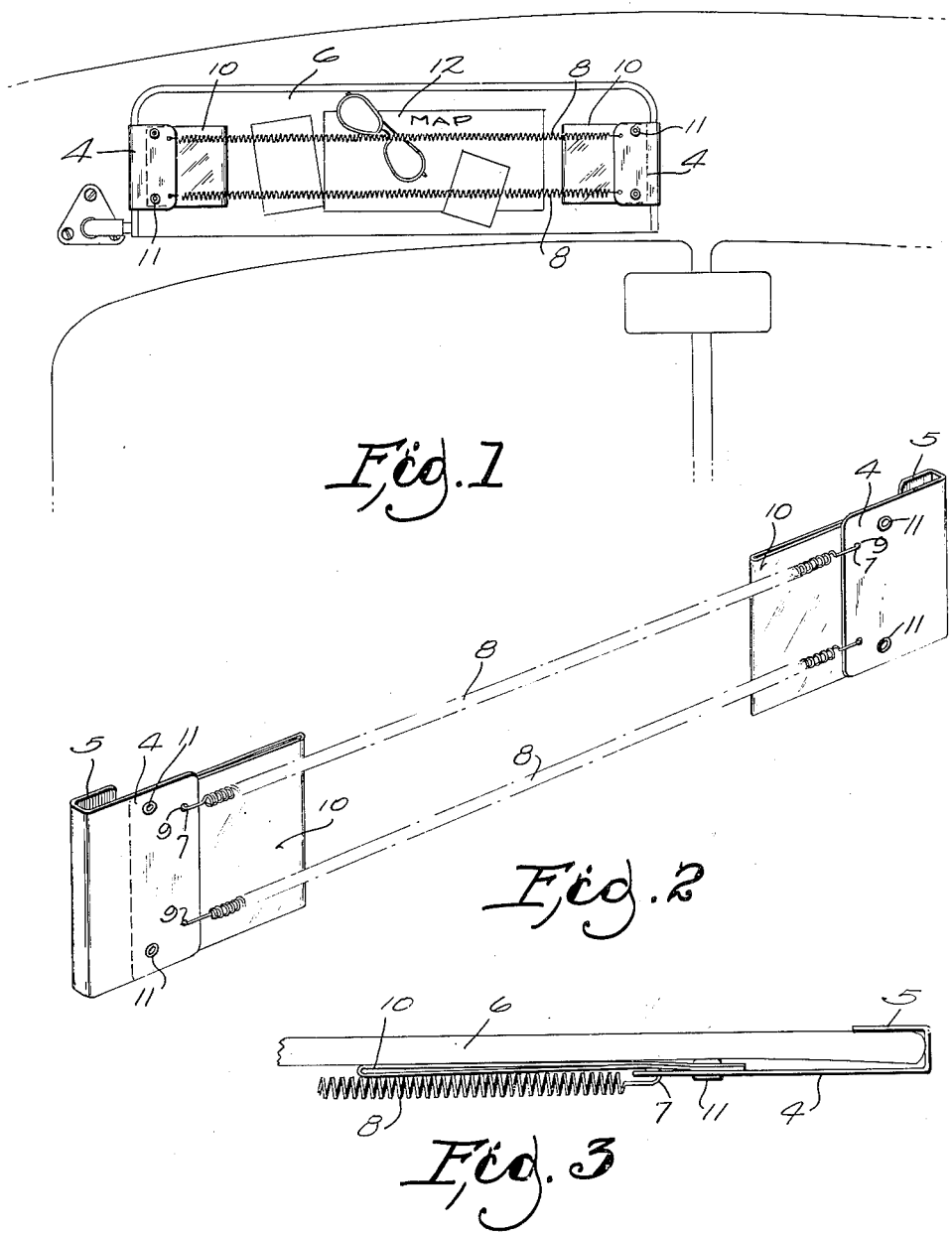
INVENTOR
ERVIN P. DIEFENBACH
BY
Wheeler, Wheeler + Wheeler
ATTORNEYS Patented Mar. 18, 1952

2,589,348

UNITED STATES PATENT OFFICE 2,589,348

ATTACHMENT FOR AUTOMOBILE SUN VISORS

Ervin P. Diefenbach, Milwaukee, Wis.

Application January 29, 1947, Serial No. 725,090

2 Claims. (Cl. 224—42.42)

This invention relates to improvements in attachments for automobile sun visors.

It is the object of the invention to provide a novel and improved carrier for maps and other small items, and so construct the improved attachment that it is of virtually universal application. Further objects of the invention include the provision of an attachment in which means protecting the upholstery also serves as a mounting case for a driver's license, photograph, or other small article, wherein such an article is securely, but visibly, held.

Still other objects of the invention relate to simplicity, economy, and convenience of manufacture, as will be apparent from the following disclosure.

In the drawings:

Fig. 1 fragmentarily illustrates the interior front portions of a motor vehicle, on which my improved attachment is illustrated in elevation, as it appears when in use.

Fig. 2 is an enlarged detail view in perspective showing the attachment separately.

Fig. 3 is a still further enlarged, fragmentary detail view in plan showing one end of my improved attachment.

A pair of plates 4, having channel-shaped flanges 5, serve as hooks engageable with the ends of a conventional sun visor 6. The hooks 7 at the respective ends of a pair of springs 8 are engaged in apertures 9 spaced near the top and bottom of the respective plates 4.

The envelopes 10, made by folding upon itself a sheet of celluloid or other transparent, plastic material, are fastened by the eyelets or rivets 11 to the respective plates, preferably being secured at the rear thereof so that the folded marginal portions of the respective envelopes project beyond the plates toward each other in face contact with a sun visor 6, upon which the device is mounted. In this position, the envelopes intervene between the upholstery of the sun visor and the hooks of springs 8, assuming that the hooks are inwardly directed. Thus, the envelopes are not only adapted to receive and support photographs, driver's license, and the like in full view of the operator, but they protect the visor 6 from contact with any portion of the springs 8.

The length of the springs 8 is such that the springs have to be tensioned in order to engage the hooks 5 over the ends of the sun visor. Thus, the tension of the springs holds the hooks 5 in place and, at the same time, is sufficient to receive and yieldingly support any desired items, including not only flat paper articles such as the map 12, but even pairs of sun glasses or other small accessories.

Since the visor is wholly protected from any parts of the apparatus which might injure it, the flanges 5 being too much elongated to cause injury, the entire apparatus may be removed if desired by simply separating the plates 4 and lifting them from the visor. However, the removal of the device is not required during any normal use of the visor, the tension of the springs being adequate to support the stored articles in all visor positions.

As compared with any other type of tension spring, the helical springs disclosed in the drawings are advantageous in that the wire coils hold the mounted articles more securely than they would be held by, for example, a rubber band spring. Particularly where the articles have substantial bulk, as in the case of sun glasses, parts of the articles tend to engage between the coils of the springs, and are thereby more securely positioned than by friction alone.

I claim:

1. An attachment for an automobile sun visor comprising a pair of plates having opposed channel-shaped hook flanges, said plates having upper and lower apertures, tension coil springs having hooks engaged in the respective apertures of the respective plates, said springs extending in substantial parallelism between said plates, transparent envelopes, each comprising a folded sheet of transparent material disposed behind portions of said plates and extending therefrom behind portions of said springs, and means connecting said envelopes with said plates in positions such that said envelopes lie behind the apertures of said plates with which the hooks of said springs are engaged, the springs being of such length as to be tensioned when the flanges of the plates are hooked over the ends of a sun visor.

2. An attachment for an automobile sun visor comprising a pair of plates having opposed, hook-shaped channels, helical tension springs extending in substantial parallelism between the plates for the support of articles removably positioned between the springs and visor, and having hooks at their ends engaged with the plates, and transparent envelopes attached to the plates and projecting therefrom to lie between the visor and the point of connection between the springs and the plates.

ERVIN P. DIEFENBACH.

REFERENCES CITED

The following references are of record in the file of this patent:

UNITED STATES PATENTS

| Number | Name | Date |
|---|---|---|
| 373,767 | Butler | Nov. 22, 1887 |
| 1,511,864 | Altmyer | Oct. 14, 1924 |
| 1,867,985 | Prevost et al. | July 19, 1932 |
| 2,048,105 | Cobbs | July 21, 1936 |
| 2,118,714 | Ross | May 24, 1938 |
| 2,181,324 | Glover | Nov. 28, 1939 |
| 2,517,337 | Nodle | Aug 21, 1950 |